United States Patent [19]

Zwirn et al.

[11] Patent Number: 4,517,599
[45] Date of Patent: May 14, 1985

[54] RESOLUTION ENHANCEMENT AND ZOOM BY DEGRADATION ESTIMATES

[75] Inventors: Robert Zwirn; Edward J. Dragavon, both of Los Angeles; Brian Smithgall, Hermosa Beach, all of Calif.

[73] Assignee: Hughes Aircraft Company, El Segundo, Calif.

[21] Appl. No.: 461,354

[22] Filed: Jan. 27, 1983

[51] Int. Cl.$^3$ ............................................. H04N 5/14
[52] U.S. Cl. ...................................... 358/166; 358/37
[58] Field of Search ................... 358/166, 167, 36, 37; 382/42, 54

[56] References Cited

U.S. PATENT DOCUMENTS

| | | | |
|---|---|---|---|
| 4,330,833 | 5/1982 | Pratt | 358/166 |
| 4,402,006 | 8/1983 | Karlock | 358/166 |
| 4,463,381 | 7/1984 | Powell | 358/166 |

Primary Examiner—Michael A. Masinick
Attorney, Agent, or Firm—Mark J. Meltzer; Victor G. Laslo; A. W. Karambelas

[57] ABSTRACT

In this invention, the resolution is enhanced by first effectively decreasing the scan angle subtended between adjacent samples significantly below that of the Rayleigh limit to obtain an image blurred by the point spread function (or diffraction pattern) of the aperture. The next step is to process this blurred image to at least partially remove the blur. The unblurring process consists of convolving this finely sampled blurred image with a specially designed convolution mask. This mask effectively outputs an enhanced pixel at each step of the convolution.

The mask simultaneously performs the equivalent of the following operations:
(1) blur the image again;
(2) subtract this reblurred image from the original image to form degradation estimates; and
(3) add the estimates of the losses back into the original image.

6 Claims, 12 Drawing Figures

RESOLUTION ENHANCEMENT AND ZOOM BY DEGRADATION ESTIMATES

BACKGROUND OF THE INVENTION

Image systems including television cameras, charge coupled device imagers, forward looking infrared sensors, and infrared charge coupled device detectors produce a video image having a resolution limited by the sampling rate of the imager. Designers of such systems typically limit the sampling rate to slightly more than two samples between the first zeros of the diffraction blur (in accordance with the Nyquist criteria). The Rayleigh resolution limit (computed from the size of the aperture and the wavelength of the scene energy) described the limits of what the eye can see. A discussion of the Rayleigh limit is given in Jenkins and White, *Fundamentals of Optics*, McGraw-Hill, 1957 at page 304. Specifically, a minimum angle of resolution between two points for an imager having a circular aperture of diameter D sensing light wavelength $\lambda$ is $0.244\lambda/D$ radians. Accordingly, scanning imager systems are typically designed so that the scan angle subtended between adjacent samples is less than $0.122\lambda/D$ radians.

SUMMARY OF THE INVENTION

In this invention, the resolution of an object is enhanced by first effectively decreasing the scan angle subtended between adjacent samples to well below that of the Rayleigh limit to obtain a better estimate of an image blurred by the point spread function (or diffraction pattern) of the aperture. The next step is to process this blurred image to at least partially remove the blur. The unblurring process consists of convolving this finely sampled blurred image with a specially designed convolution mask. This mask effectively outputs an enhanced pixel at each step of the convolution.

The mask simultaneously performs the equivalent of the following operations:

(1) blur the image again;
(2) subtract this reblurred image from the original image to form degradation estimates; and
(3) add the estimates of the losses back into the original image.

In one embodiment of the invention, the increase in sampling rate beyond the Rayleigh limit in a conventional imager having its sampling rate limited by the Rayleigh criterion is achieved by using multiple image registration. This technique allows the present invention to be used on existing imaging systems. In the multiple image registration of this invention, a single multiple-registered video frame consisting of a plurality of subpixels of reduced area is constructed from a plurality of normal video frames, each comprising a plurality of standard pixels. The image motion or camera jitter between subsequent normal video frames determines the subpixel displacement in the multiple-registered video frame. Implementation of multiple-image registration in already existing system hardware may be accomplished using a correlation tracker, or image motion compensating servo error or camera platform stabilizing gyro error. The subpixel displacement is determined in this way.

In another embodiment of the invention, the number of samples in a given angle of scan in a conventional imager may be increased by using image interpolation and zoom. Image interpolation and zoom is useful when there is not enough time to process a plurality of video frames to construct a multiple-registered video frame. Another technique is to use smaller sized detectors in order to achieve dense sampling in a single frame.

DESCRIPTION OF THE FIGURES

The invention may be understood by reference to the accompanying drawings, of which:

FIG. 1b illustrates the diffraction pattern or point spread function corresponding to FIG. 1a;

FIG. 2b illustrates a sub-pixel mosaic synthesized from the four multiple-registered video frames of FIG. 2a;

DETAILED DESCRIPTION OF THE INVENTION

Figure 1A:
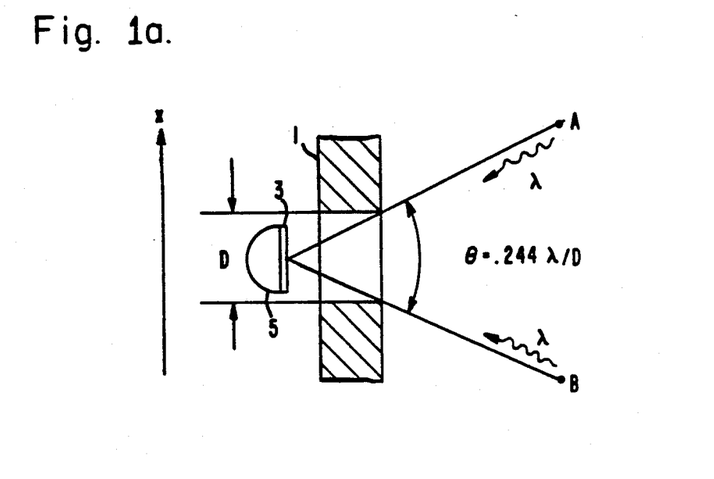
FIG. 1a illustrates a typical aperture and sensor receiving light from two point sources.

FIG. 1a is a simplified schematic diagram illustrating two points A, B viewed through a circular aperture 1 (shown in cross-section) of diameter D by a lens 3 of a camera 5 sensing radiation of wavelength $\lambda$ emitted or reflected from the two points A and B. The angle $\theta$ subtended between the two points A and B at the lens 3 is equal to the Rayleigh limit $0.244\lambda/D$.

Figure 1B:
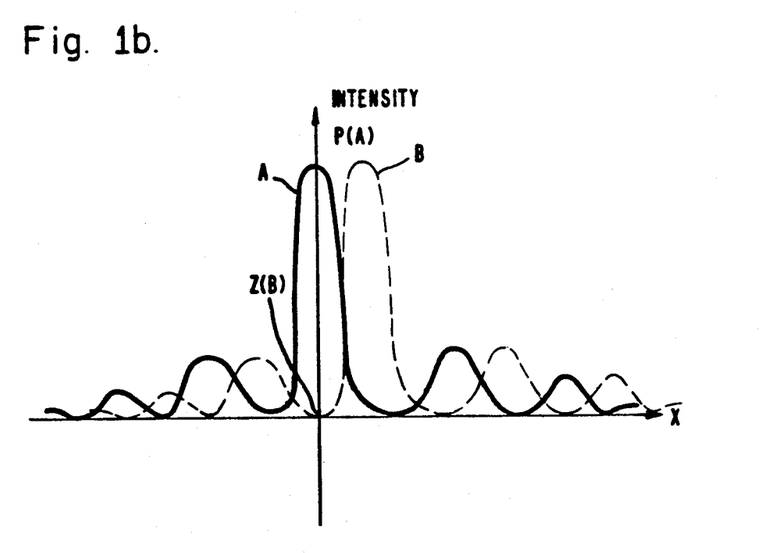

FIG. 1b is a diagram illustrating the corresponding diffraction patterns produced at the lens 3 by the radiation from point A (solid line) and from point B (dash line) in which the ordinate corresponds the photon intensity and the abscissa corresponds the position along the X axes of FIG. 1a. Such diffraction patterns of point source images are uniquely characteristic of the aperture and are termed "Point Spread Functions".

The Rayleigh criterion establishes the resolution limit of two points viewed through an aperture. Specifically, the Rayleigh criterion states that the minimum perceptible separation between the two points A and B occurs where the peak P(A) of the diffraction blur of one point corresponds to the first zero Z(B) of the diffraction blur of the other point. This is exactly the condition illustrated in FIG. 1b. This criterion is based upon the fact that, below this separation, there is no longer a discernable diffraction valley between the peaks. However, it is a principle of this invention that the Rayleigh criterion relates to the behavior of the human eye and is not a fundamental limit on the resolution of an image viewed through a particular aperture, and in fact a greater resolution is possible if processing is used. Specifically, the shape of the blurred image of two points, whose separation is precisely at the Rayleigh limit, is different from that of a single point. Furthermore, the blurred image of the two points continues to go through subtle changes below the Rayleigh limit until the two points actually coincide in the scene. (Of course, upon coincidence they are definitely unresolvable). Accordingly, there is realizable information contained in a blurred image of two points separated by a distance below that of the Rayleigh criterion. Extraction of this information is accomplished in the present invention.

MULTIPLE IMAGE REGISTRATION

Figure 2A:
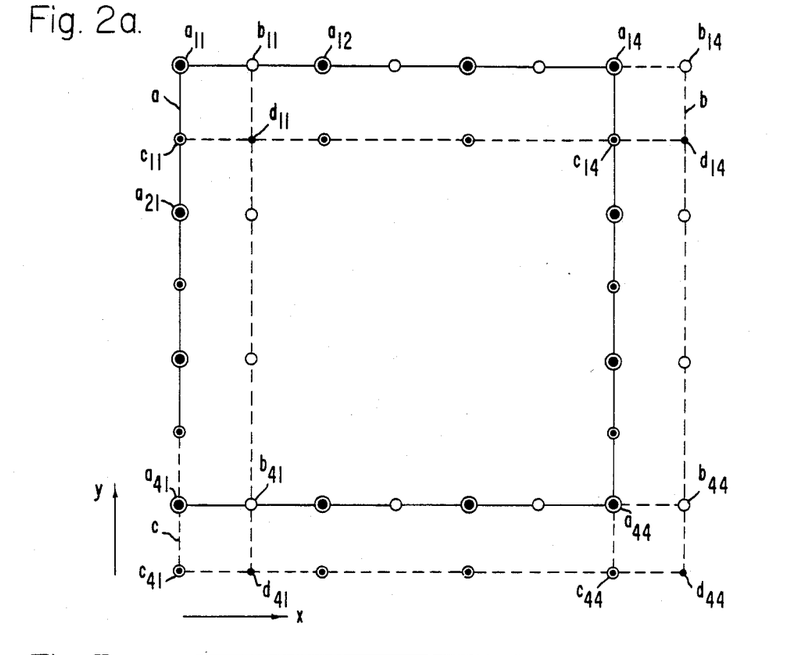
FIG. 2a illustrates four multiple-registered video frames.
Figure 2B:
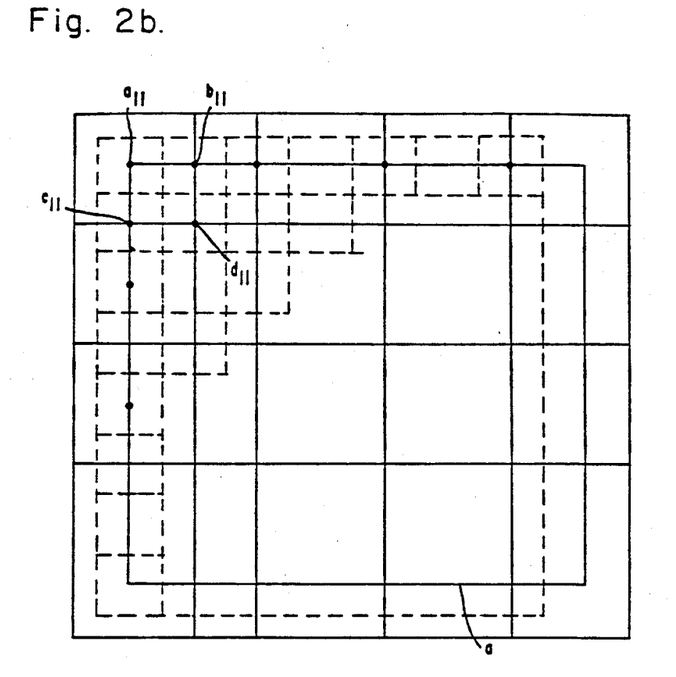

FIGS. 2a and 2b illustrate the multiple image registration used in this invention with the simple example of a video frame having only sixteen pixels, four on each side. In FIG. 2a, a video frame, "a", comprises sixteen pixels each centered around sixteen respective points $a_{ij}$. The location of each of the center points $a_{ij}$ of the sixteen pixels is illustrated in FIG. 2a while the mosaic of the corresponding pixels themselves is illustated in FIG. 2b in solid line.

Multiple image registration is achieved by sampling and storing the sixteen pixels of data comprising the video frame a of FIG. 2a illustrated in solid line. Then the camera 5 is displaced in the x direction so as to sample a second video frame b illustrated in dashed line comprising sixteen pixels $b_{ij}$. The displacement in the x direction between the video frames a and b is equal to half the distance between the center points $a_{11}$ and $a_{12}$. The sixteen pixels of data corresponding to the sixteen center points $b_{ij}$ are sampled and stored. The camera 5 is again displaced to sample a third video frame c illustrated in dotted line in FIG. 2a. The video frame c is displaced from the original video frame a in the y direction by half the distance between the center points $a_{11}$ and $a_{21}$. The sixteen pixels corresponding to the sixteen center points $c_{ij}$ are then sampled and stored. The camera 5 is then displaced from the location corresponding to the video frame c in the x direction by a distance corresponding to half the pixel spacing to sense a fourth video frame d illustrated in FIG. 2a in dashed-dotted line. The sixteen pixels corresponding to the sixteen center points $d_{ij}$ of the video frame d are then sampled and stored.

A composite of the stored data from the video frames a, b, c and d is then formed by reorganizing the data in the order illustrated in FIG. 2b. Specifically, FIG. 2b illustates the data corresponding to the pixel center points $a_{11}$, $b_{11}$, $c_{11}$ and $d_{11}$ in a multiple-registered or composite video frame indicated in dashed line in FIG. 2b. Each of the points $a_{11}$, $b_{11}$, $c_{11}$ and $d_{11}$ is now the center of a corresponding subpixel illustrated in dashed line in FIG. 2b. The number of subpixels in the resulting composite mosaic is equal to the square of the sampling improvement times the number of pixels in any one of the original video frames (in our example $2^2 \times 16 = 64$ subpixels). The dashed line subpixels of FIG. 2b are of smaller dimension than the solid line pixels by a factor of 2.

As a general rule, in a multiple registration of n video frames, the video frames are displaced from one another by fraction $(1/n)^{\frac{1}{2}}$ of the pixel spacing. Thus, while FIG. 2b illustrates a multiple image registration of four video frames in which the pixel dimension is reduced by a factor of two, other reduction factors may be achieved by multiple image registration.

Even though the granularity of the video data has been reduced by the multiple image registration, the image represented by the data is nevertheless blurred in accordance with the point spread function of the aperture through which the image was viewed.

Figure 2C:
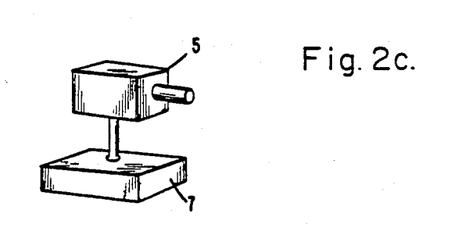
FIG. 2c illustrates an imaging device suitable for generating multiple-registered video frames.

In practice, correlation of the spatial displacement between video frames with the reorganization of the stored video data may be made by means of a camera or sensors 5 mounted on a controller 7 as indicated in FIG. 2c. The controller may be a camera gyroscopic stabilization platform whose gyro error may be automatically sensed and used as the video frame displacement. Alternatively, the platform 7 may be an image motion compensator using gyro stabilization. Again, the gyro error would define the displacement between the subsequent video frames. Finally, a correlation tracker may be used to track the actual displacement due to camera jitter between video frames. Data from the correlation tracker would define the displacement between subsequent video frames. Each of these techniques is compatible with existing systems.

Figure 3:
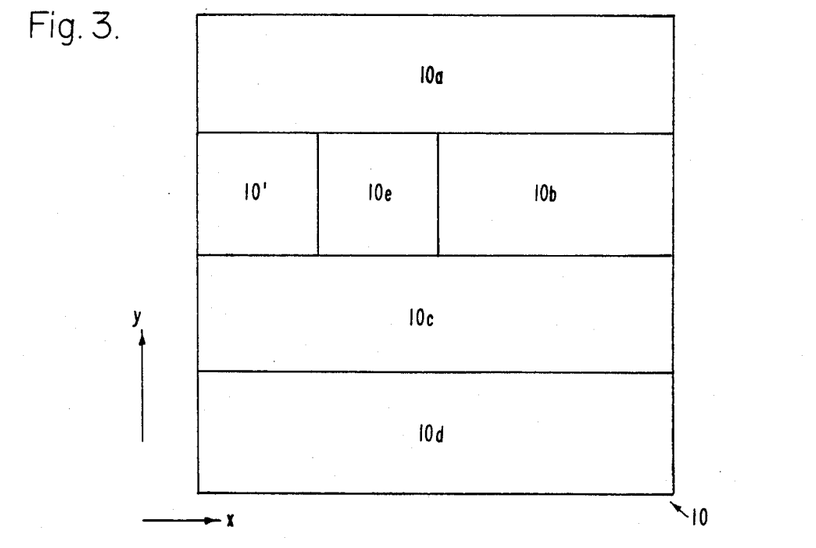
FIG. 3 illustrates a scheme for fast acquisition of multiple-registered video frames.

Referring to FIG. 3, a video frame 10 synthesized by the multiple image registration of sixteen standard video frames of about 500 lines each, could not be entirely displayed on a standard video screen. Instead, the screen could accommodate only a small fraction 10' of the multiple-registered video image. Accordingly, the data residing in those portions 10a, 10c, and 10d of the video frame of FIG. 3 correspond to unnecessary scan excursions by the imager 5 in the Y direction. It is preferable in this invention to restrict the scan of the imager 5 of FIG. 2c in the Y direction to cover only the portion of 10 illustrated in FIG. 3 as 10', 10e, and 10b. In this way, data comprising the multiple-registered image 10' which is actually displayed on a television screen may be acquired about four times faster than otherwise (for a 4-fold multiple registration).

Referring to FIG. 2b, it should be recognized that each of the points $a_{ij}$, $b_{ij}$, $c_{ij}$, $d_{ij}$ corresponds to a word of video data which may be stored in the memory of a computer. The word corresponding to each of the points $a_{ij}$, $b_{ij}$, $c_{ij}$, $d_{ij}$ may take on any number in a range of values corresponding to an analog value of the radiation intensity sensed at that point by the camera 5. Alternatively, in a low performance system, each word may simply be a binary value (black or white, on or off). However, it is contemplated in this invention that each word represents an analog value corresponding to the intensity of radiation sensed by the imager at the corresponding center point $a_{ij}$, $b_{ij}$, etc.

IMAGE INTERPOLATION AND ZOOM

It may not be possible to use multiple image registration to generate subpixel video data. This may occur, for example, when objects to be viewed in the scene are moving so fast in comparison with the rate at which subsequent video frames are generated that there is insufficient correlation of the fast moving objects between subsequent video frames. In this special situation, image interpolation and zoom may be used to generate the subpixels, instead of multiple image registration.

Figure 4:
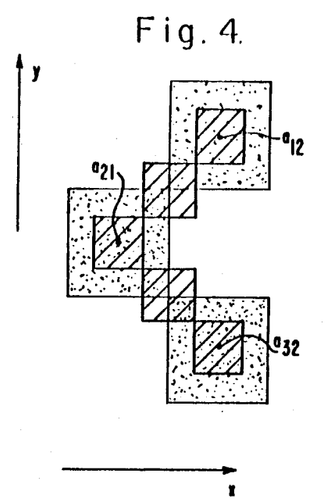
FIG. 4 illustrates an image interpolation technique which may be used in this invention in lieu of the multiple-registration technique of FIGS. 2a, 2b, and 2c.

Referring to FIG. 4, a subpixel of video data is generated from a single video frame. The exemplary portion of the video frame a of FIG. 4 comprises a plurality of stored words of video data in which only the words corresponding to pixel center points $a_{12}$, $a_{21}$ and $a_{32}$ represent a non-zero intensity, corresponding to the shaded areas of the video frame a of FIG. 4.

Image interpolation is achieved by estimating the value of a point located between pixels. The image data is interpolated between the pixels to achieve a linear transition between the three points $a_{12}$, $a_{21}$ and $a_{32}$, as illustrated in FIG. 4 in the heavier solid line. The resulting interpolated image is represented in cross hatching in FIG. 4. The new interpolated image, corresponding to the cross-hatched area, contains more information than the old image corresponding to the shaded area.

Interpolation of the analog intensity values among the subpixels in the shaded area is made in accordance with the following equations defining the intensity value of the a data word representing a subpixel $a'_{ij}$:

$a'_{ij} = a_{ij}$ if $a_{ij}$ is the center point of a sample pixel in the original video frame a.

Otherwise:

$a'_{ij} = a$ linear interpolation between the analog values of adjacent $a_{ij}$ from the original video frame a.

Data from sampled video frames can update the estimates from previously interpolated subpixels if combined by a suitable weighting factor. The foregoing image interpolation and zoom techniques are well known and are described in various publications including, for example: Pratt, *Digital Image Processing*, Wiley & Sons, New York, pages 110–116. Accordingly, the image interpolation and zoom technique will not be described in greater detail here.

In summary, by the use of either multiple image registration or image interpolation and zoom, a video image comprising a plurality of fine subpixels may be constructed from a plurality of video frames comprising a plurality of normally sized pixels. A larger number of small detectors could also be used to improve sampling density. However, the information contained in the subpixel composite video frame is still blurred in accordance with the diffraction point spread function of the aperture through which the image was viewed. Accordingly, there remains the task of removing the blur, at least partially, from the image, and reconstructing an unblurred image from the information contained in the highly sampled video frame of subpixels.

UNBLURRING BY DEGRADATION ESTIMATES

Figure 5A:
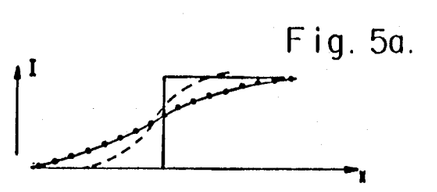
FIGS. 5a, 5b, and 5c illustrate an unblurring process employing degradation estimates.

The resolution of a subpixel multiple-registered or interpolated image may be enhanced by the use of the degradation estimate process illustrated in FIG. 5a.

Figure 5B:
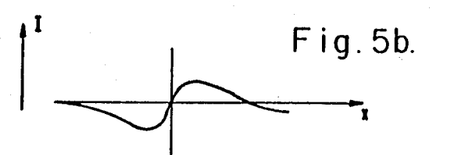
Figure 5C:
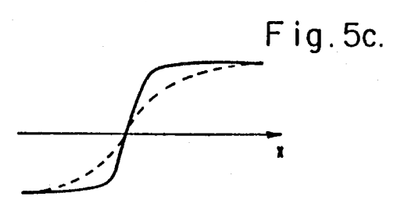

FIG. 5a illustrates the intensity as a function of position along the x axis of an original image (solid line) having a sharp edge therein and a blurred image (dashed line) distorted from the original image by the point spread function of the aperture of the camera 5. The blurred image of FIG. 5a may be reblurred by convolving it with the point spread function of the aperture of the camera 5. An exemplary result of this convolution is illustrated in dotted line in FIG. 5a, and represents the twice blurred image. An estimate of the degradation due to the aperture point spread function may be obtained by subtracting the twice blurred image (dotted line) from the blurred image (dashed line) of FIG. 5a. The result of this subtraction is illustrated in FIG. 5b, representing the estimate of degradation due to second blurring. Since the point spread function of the aperture of the camera 5 is always the same, the degradation due to second blurring of FIG. 2b may be used as an estimate of the degradation due to the first blurring between the original image of FIG. 5a (solid line) and the blurred image (dashed line). Accordingly, an estimate of the original image may be obtained from the blurred image by the addition of the degradation estimate of FIG. 5b to the blurred image (dashed line) of FIG. 5a. Their sum is illustrated in solid line in FIG. 5c. Note the enhanced corner resolution or sharpness in the solid line image of FIG. 5c.

Figure 6:
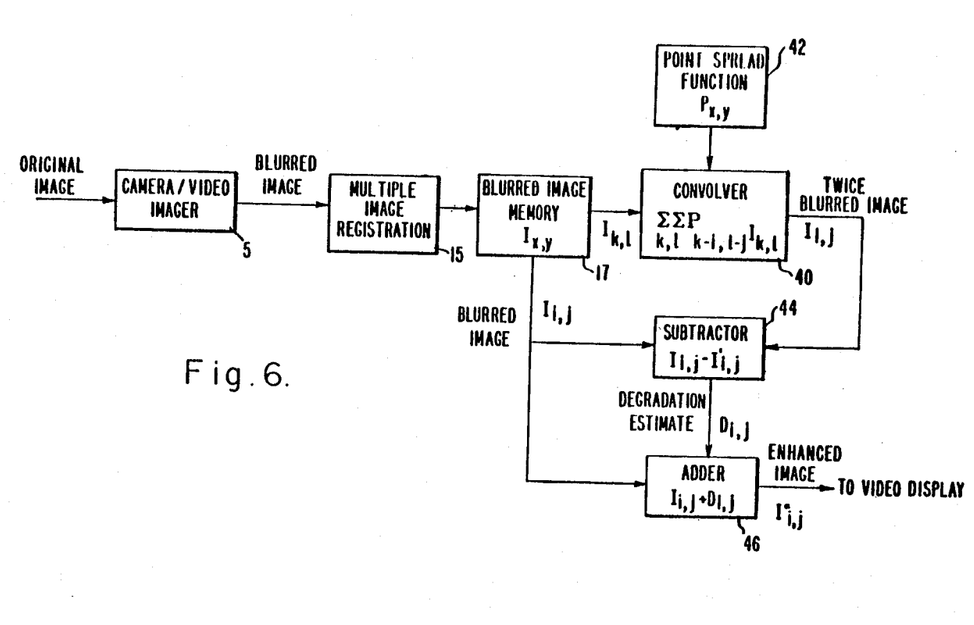
FIG. 6 is a block diagram illustrating a system for implementing the technique of FIGS. 5a, 5b and 5c.

The system illustrated in FIG. 6 implements the foregoing second blurring estimate technique and includes a camera or video imager 5 receiving an original image through its aperture. The point spread function of the aperture creates a blur so that the original image is transformed into a blurred image transmitted from the video imager 5 into the multiple image registration 15. In accordance with the discussion given previously in connection with FIGS. 2a and 2b, the multiple image registration 15 causes a blurred subpixel image accumulated in the memory 17. The memory 17 stores a matrix of video data words $I_{xy}$ which could represent a finely sampled video frame comprising a mosaic of a plurality of multiple-registered video frames generated by the imager 5. Each video data word $I_{xy}$ is fed into a convolver 40. The matrix 42 of data words $P_{xy}$ define the point spread function of the aperture of the camera 5. The convolver 40 convolves the blurred image data $I_{xy}$ with the point spread function matrix $P_{xy}$ to generate a twice-blurred image defined by video words $I'_{ij}$ in accordance with the following convolution:

$$I'_{ij} = {}_k\Sigma_l \Sigma P_{(k-i)(l-j)} I_{kl} \quad (1)$$

The estimate of the degradation due to aperture blur is obtained in the subtractor 44 by subtracting the twice-blurred image data $I'_{ij}$ from the original once-blurred image data $I_{ij}$ in accordance with the following equation:

$$D_{ij} = I_{ij} - I'_{ij}. \quad (2)$$

Thereafter, the adder 46 adds the degradation estimate $D_{ij}$ to the original unblurred image data $I_{ij}$ to obtain the estimate $I''_{ij}$ of the original unblurred image in accordance with the following equation:

$$I''_{ij} = I_{ij} + D_{ij} \quad (3)$$

Figure 7:
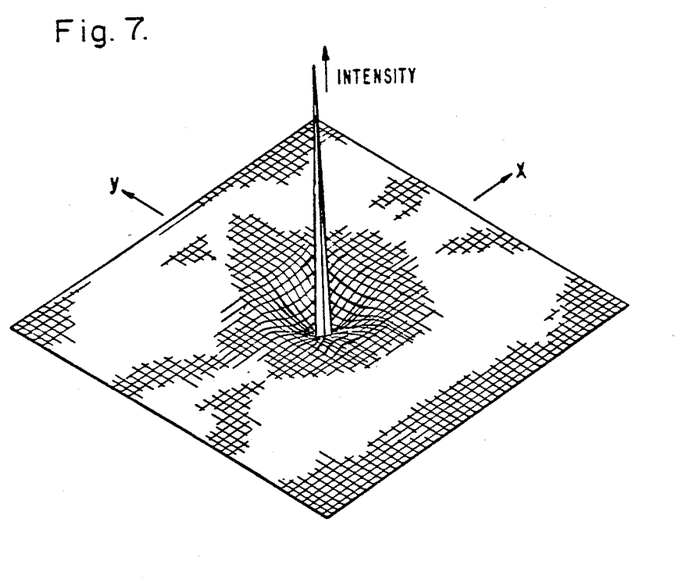
FIG. 7 is a graphic perspective view of the surface corresponding to the convolution mask used in the system of FIG. 6.

The convolver 40 convolves the blurred image data $I_{xy}$ with an impulse plus the negative of the point spread function matrix $P_{xy}$ to generate the different between a twice-blurred image defined by video data words $I'_{ij}$ and the once blurred image and sums it with the once blurred image. The configuration of FIG. 6 is tutorial. In practice, the preferred method is to utilize a convolution mask which performs a convolution process equivalent to that performed by the combination of the convolver 40, the subtractor 44 and the adder 46. This convolution mask is illustrated in FIG. 7. This mask comprises the negative of the sensor degradation and a positive impulse function on the center pixel of weight 2, the aggregate weight of the entire mask being equivalent to unity. In summary, a formula may be given for each video data word $I''_{ij}$ in the $i^{th}$ row and $j^{th}$ column of the matrix of video data words representing the estimate of the original unblurred image, as follows:

$$I''_{ij} = 2I_{ij} - {}_k\Sigma_l \Sigma P_{(k-i)(l-j)} I_{kl} \quad (4)$$

The matrix of video data comprising the data words $I''_{ij}$ corresponds to an image having its resolution enhanced in accordance with the processes illustrated in FIGS. 5a, b and c. Note that the corner definition of the original image of FIG. 5a is not completely restored in the enhanced image of FIG. 5c (solid line) corresponding to the synthesized video data words $I''_{ij}$. However, it is clear that the resolution or corner definition is vastly enhanced in comparison with the blurred image of FIG. 5a (dashed line).

What is claimed is:

1. In an imaging system comprising an imager which may view a scene through an aperture characterized by a point spread function and means responsive to said imager for generating successive frames of video data words characterized by a first sampling rate, a system for enhancing image resolution, comprising:

means for converting said video data words into a synthesized video frame of video data words, said synthesized video frame characterized by a second higher sampling rate;

means for enhancing the resolution of the image represented by said synthesized video frame, comprising:

means for convolving said synthesized video data words with said point spread function to generate a video data word corresponding to a twice-blurred image;

means for subtracting said twice-blurred image video data word from a corresponding one of said synthesized video data words to obtain a video data word corresponding to a degradation estimate; and means for adding said degradation estimate video data word and said corresponding one of said synthesized video data words to obtain an enhanced image video data word.

2. The system of claim 1 wherein said means for converting into a synthesized video frame comprises multiple image registration means for forming a mosaic of displaced ones of said successive video frames generated by said imager.

3. The system of claim 1 wherein said means for converting into a synthesized video frame comprises means for performing image interpolation in a single one of said successive video frames.

4. The system of claim 1 further comprising an array or detectors having a detector-to-detector sampling rate greater than the Nyquist rate.

5. The system of claim 1 wherein said enhancing means performs said convolving, subtracting and adding using a single convolution mask.

6. In an imaging system including an imager which views a scene through a system which has a limiting aperture characterized by a point spread function, a method for enhancing image resolution comprising:

increasing the sampling density of a blurred image to produce a highly sampled blurred image;

convolving said highly sampled blurred image with said point spread function to generate a twice blurred image;

subtracting said twice blurred image from said highly sampled blurred image to obtain a degradation estimate; and adding said degradation estimate to said highly sampled blurred image.

* * * * *